US00RE47210E

(19) United States
(12) Reissued Patent
Lam

(10) Patent Number: US RE47,210 E
(45) **Date of Reissued Patent: *Jan. 22, 2019**

(54) CRATES

(71) Applicant: Goodpack IBC (Singapore) Pte. Ltd., Singapore (SG)

(72) Inventor: David Lam, Singapore (SG)

(73) Assignee: Goodpack IBC (Singapore) Pte. Ltd., Singapore (SG)

( * ) Notice: This patent is subject to a terminal disclaimer.

(21) Appl. No.: 14/932,811

(22) Filed: Nov. 4, 2015

Related U.S. Patent Documents

Reissue of:
(64) Patent No.: 8,573,427
Issued: Nov. 5, 2013
Appl. No.: 12/370,966
Filed: Feb. 13, 2009

(30) Foreign Application Priority Data

Feb. 13, 2008 (GB) ..... 0802642.9

(51) Int. Cl.
*B65D 6/16* (2006.01)
*B65D 6/26* (2006.01)
*B65D 19/12* (2006.01)

(52) U.S. Cl.
CPC ..... *B65D 7/30* (2013.01); *B65D 19/12* (2013.01); *B65D 2519/00024* (2013.01); *B65D 2519/00034* (2013.01); *B65D 2519/00059* (2013.01); *B65D 2519/00069* (2013.01); *B65D 2519/00164* (2013.01); *B65D 2519/00174* (2013.01); *B65D 2519/00233* (2013.01); *B65D 2519/00243* (2013.01); *B65D 2519/00273* (2013.01); *B65D 2519/00323* (2013.01); *B65D 2519/00333* (2013.01); *B65D 2519/00606* (2013.01); *B65D 2519/00611* (2013.01); *B65D 2519/00656* (2013.01); *B65D 2519/00691* (2013.01); *B65D 2519/00925* (2013.01)

(58) Field of Classification Search
CPC ..... B65D 7/30
USPC ..... 220/7
See application file for complete search history.

(56) References Cited

U.S. PATENT DOCUMENTS 2,666,552 A * 1/1951 Coit, Jr. ..... 206/511
3,782,579 A * 1/1974 Zarges ..... B65D 7/24 220/4.28

(Continued)

FOREIGN PATENT DOCUMENTS

DE 2442322 3/1976
GB 2180820 4/1987

(Continued)

OTHER PUBLICATIONS

International Search Report for Application No. GB0802642.9 dated Jun. 13, 2008.

*Primary Examiner* — Robert M Fetsuga
(74) *Attorney, Agent, or Firm* — Fitch, Even, Tabin & Flannery LLP

(57) ABSTRACT

A collapsible crate for transporting goods, the crate having an upstanding wall, at least a portion of which is movable, locating feature and releasable locking feature for releasably securing the movable wall portion relative to the crate, wherein the locating feature has a projection receivable within a recess or aperture to align, in use, the movable wall portion relative to the crate such that the movable wall portion is releasably securable by the locking feature.

9 Claims, 8 Drawing Sheets

(56) References Cited

U.S. PATENT DOCUMENTS

| | | | | |
|---|---|---|---|---|
| 4,020,967 | A * | 5/1977 | Hammond | B65D 7/24 206/511 |
| 4,091,950 | A * | 5/1978 | Craven | 212/47 |
| 4,186,841 | A * | 2/1980 | Buckley | B65D 19/12 206/511 |
| 4,591,065 | A * | 5/1986 | Foy | 220/7 |
| 4,735,331 | A * | 4/1988 | Keenan et al. | 220/6 |
| 4,775,068 | A * | 10/1988 | Reiland et al. | B65D 19/18 220/1.5 |
| 4,872,574 | A | 10/1989 | Lam | |
| 4,960,223 | A * | 10/1990 | Chiang et al. | 220/7 |
| 5,161,709 | A | 11/1992 | Oestreich, Jr. | |
| 5,253,763 | A * | 10/1993 | Kirkley et al. | 206/600 |
| 5,289,935 | A * | 3/1994 | Hillis et al. | 220/4.03 |
| 5,938,059 | A * | 8/1999 | Luburic | 220/6 |
| 6,415,938 | B1 * | 7/2002 | Karpisek | 220/1.5 |
| 6,601,724 | B1 * | 8/2003 | Koefelda | B65D 25/005 220/4.28 |
| 7,784,631 | B2 * | 8/2010 | Winn | B65D 19/06 220/1.5 |
| 2002/0070215 | A1 * | 6/2002 | Walsh et al. | 220/6 |
| 2004/0069780 | A1 | 4/2004 | Apps et al. | |
| 2004/0178197 | A1 * | 9/2004 | Hsu et al. | 220/7 |

FOREIGN PATENT DOCUMENTS

| | | | | |
|---|---|---|---|---|
| GB | 2216101 | | 10/1989 | |
| IT | 1234634 | | 5/1992 | |
| JP | 2007168822 | A * | 7/2007 | B65D 6/18 |
| WO | WO 8810223 | A1 * | 12/1988 | B65D 88/52 |
| WO | 9303981 | | 3/1993 | |
| WO | 9509110 | | 4/1995 | |
| WO | 9914137 | | 3/1999 | |
| WO | 03055755 | | 7/2003 | |
| WO | WO 03/055755 | A2 * | 7/2003 | |

* cited by examiner

CRATES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application [takes its ] *is a reissue application of Ser. No. 12/370,966, filed on Feb. 13, 2009, now U.S. Pat. No. 8,573,427 which claims* priority [under Section 35 USC 119(a) from] *to* British Application No. GB 0802642.9, filed on Feb. 13, 2008, and whose entire disclosure is incorporated by reference [therein] *herein.*

BACKGROUND OF THE INVENTION

This invention relates to crates, and more specifically, to re-usable crates in which goods may be transported, for example in sea going containers. More specifically, although not exclusively, the invention relates to a crate which can be used to transport relatively heavy goods, for example which can be packed to a high density in standardised large shipping containers and/or which can be collapsed to reduce space for transporting or storage when empty.

Crates for this purpose have been proposed such as that which is disclosed in WO 03/055755 (co-owned by the applicant), the entire contents of which are incorporated herein. The crate disclosed in this document includes a base with feet, corner posts, a pair of opposed longer side walls and a pair of shorter end walls, each side wall comprising a pair of hinged panels mounted between hinged corner posts, the panels and posts being mutually rotatable about their hinges to allow collapse of the walls into an area defined by the base.

Other crates have also been proposed, for example: WO 99/14137, IT 1234634, DE 2442322, WO 95/09110, WO 03/055755, GB 2180820, GB 2216101, U.S. Pat. No. 4,872,574 and WO 93/03981.

It is a non-exclusive object of the invention to provide an improved crate, for example a collapsible crate, for transporting goods.

It is a further, more specific, non-exclusive object of the invention to provide a collapsible crate having a wall portion which is movable and/or removable for providing access to the contents of the crate.

SUMMARY OF THE INVENTION

According to one aspect of the invention, there is provided a collapsible crate for transporting goods, the crate comprising an upstanding wall, at least a portion of which is movable, locating means and releasable locking means for releasably securing the movable wall portion relative to the crate, wherein the locating means comprises a projection receivable within a recess or aperture to align, in use, the movable wall portion relative to the crate such that the movable wall portion is releasably securable by the locking means.

The locating means or a further locating means may be at or adjacent a lower portion, for example an edge, of the wall portion and/or at or adjacent an upper portion, for example an end or edge, or the movable wall portion. The releasable locking means may be at or adjacent an upper portion, for example an end or edge, of the removable wall portion. The locating means or further locating means may operably cooperate, in use, with the locking means, for example to secure the lower portion, for example an end or edge, of the removable wall portion against movement thereof.

According to a second aspect of the invention, there is provided a collapsible crate for transporting goods, the crate comprising an upstanding wall, at least a portion of which is removable, locating means at or adjacent a lower portion, for example an edge, of the wall portion and releasable locking means at or adjacent an upper portion, for example an end or edge, of the removable wall portion, wherein the locating means is operably cooperable, in use, with the locking means to secure the lower end or edge of the removable wall portion against movement thereof.

The locating means may comprise a projection, for example on one of the removable wall portion or adjacent portion of the crate, received or receivable within a recess or aperture, for example in the other of the wall portion or adjacent portion of the crate.

The projection may be located on a fixed or fixable portion of the wall and/or may extend upwardly. Alternatively or additionally the or a projection may be located on a lower edge of the removable wall portion and/or may extend downwardly, for example to be received or receivable within the or an aperture or recess in the or a fixed or fixable wall portion. The projection and/or recess or aperture may extend along at least a portion, for example substantially the entire length, of the or an edge of the removable wall portion or crate or fixed or fixable wall portion.

Additionally or alternatively, the locating means or further locating means may be located at or adjacent the or an upper end or edge of the removable wall portion. The locating means or further locating means may comprise a projection, for example a spigot, which may be on one of the removable wall portion or adjacent portion of the crate and/or may be receivable within a recess or aperture, for example in the other of the removable wall portion or adjacent portion of the crate. The adjacent portion of the crate may be the or a fixed or fixable portion of the wall. The locating means or further locating means may comprise a projection at or adjacent each upper corner of the removable wall portion.

The fixed or fixable wall portion may be pivotable, in use, relative to a base of the crate. The crate may further comprise a further three walls, for example such that the crate comprises an open top and/or may include a cover, for example a removable cover. The or a base of the crate may be square or rectangular in plan, for example wherein the crate is of cubi-form or parallelepiped form.

The locking means may comprise a locking pin, for example which is resiliently biased such as spring-loaded, mounted or located in, on or adjacent one of the movable or removable wall portion and the crate, for example the fixed or fixable wall portion. The locking pin may be receivable within an aperture or hole in the other of the movable or removable wall portion and the crate, for example the fixed or fixable frame portion.

The crate may further comprise an extension portion, wherein the extension portion is provided on the upper face of the crate such that, in use, for example when one crate is stacked upon another, the extension portion engages within a recess on the underside of an immediate above crate.

The extension portion and the recess may be interchanged in alternative embodiments of the invention.

The upstanding wall of the crate may be affixed to a base of the crate by hinge means.

The hinge means may comprise a hinge pin, a hinge leg and a hinge slot, wherein one of the hinge leg or the hinge slot is attached to the upstanding wall and the other of the hinge leg or the hinge slot is attached to the base.

The hinge leg may further comprise a bore extending therethrough for receiving the hinge pin, in use.

Preferably, the shaft of the hinge pin and the walls of the bore of the hinge leg comprise screw threading.

DESCRIPTION OF THE DRAWING

One embodiment of the invention will now be described, by way of example only, with reference to the accompanying drawings in which.

DETAILED DESCRIPTION OF THE PREFERRED EMBODIMENT

Figure 1:
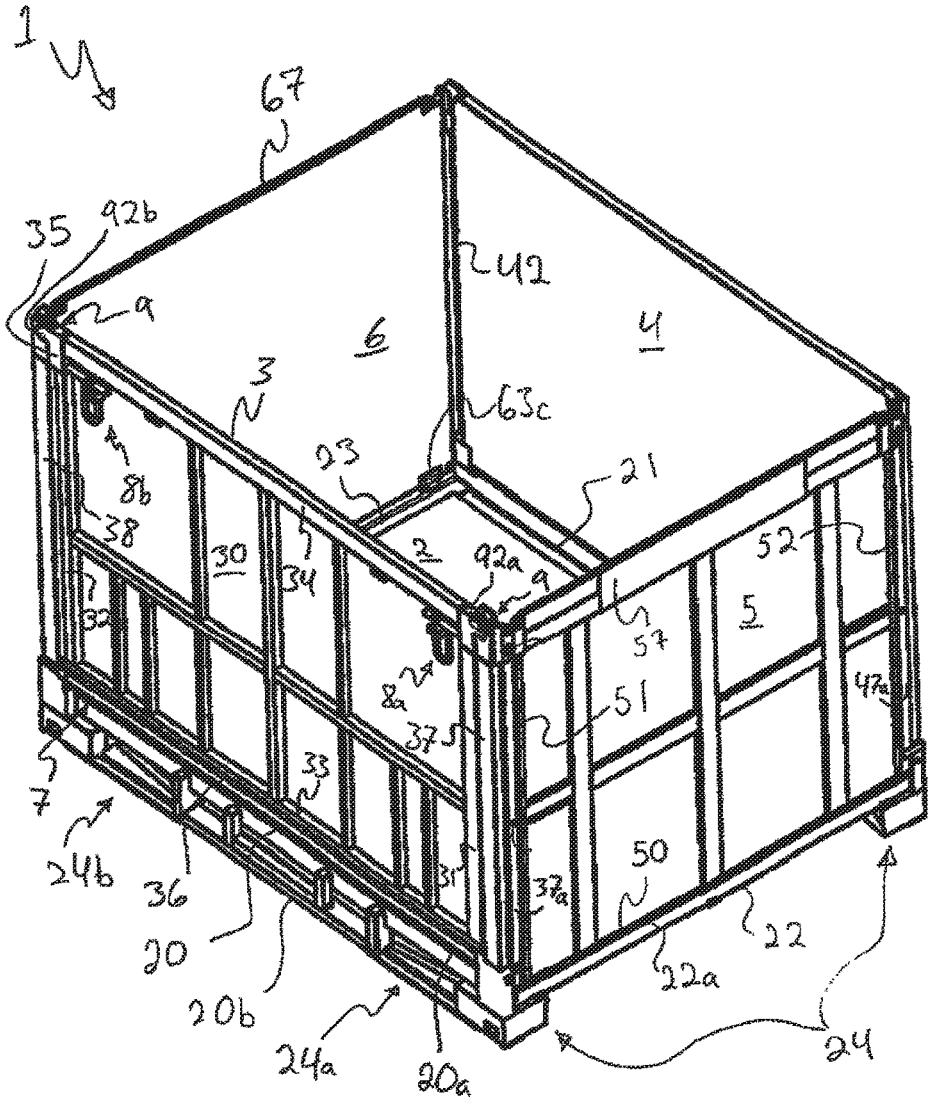
FIG. 1 is a perspective view of a crate according to the invention.
Figure 2:
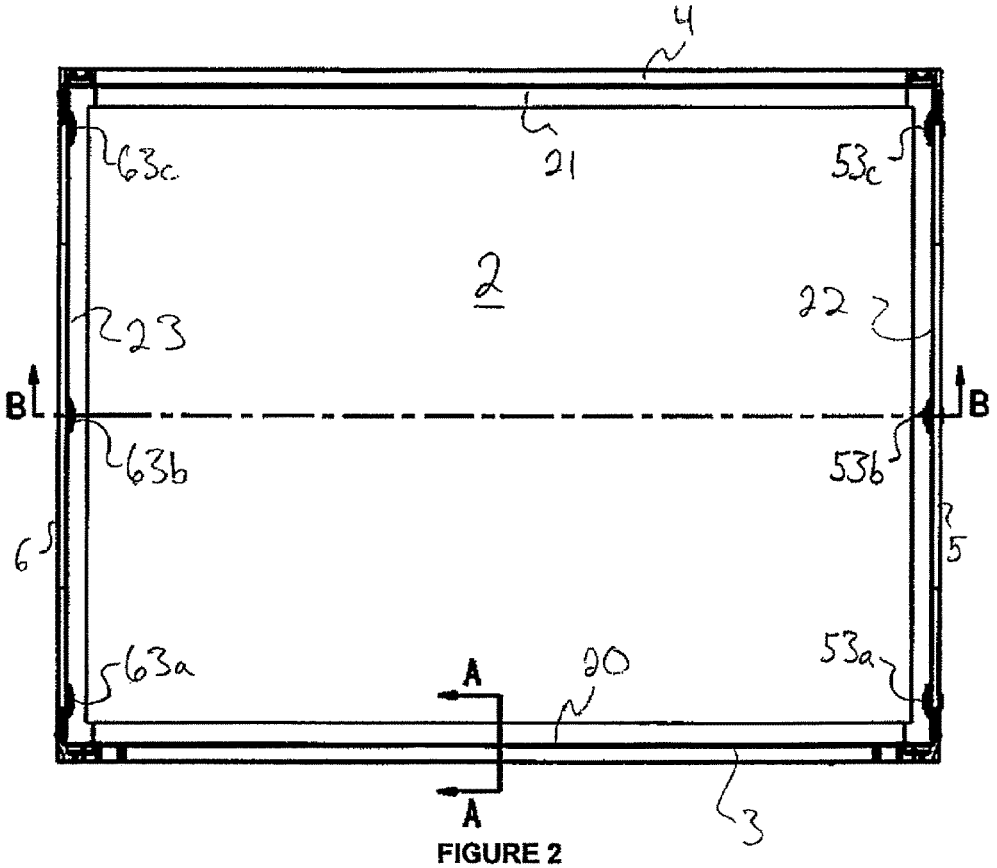
FIG. 2 is a top view of the crate of FIG. 1.

Referring to FIG. 1, there is shown a crate 1 according to the invention in an erected condition. The crate 1 includes a base 2, a pair of side walls 3, 4, a pair of end walls 5, 6, a lower locating means 7, a locking means 8a, 8b and an upper locating means 9.

The base 2 is substantially rectangular in plan and includes two side edges 20, 21, two end edges 22, 23 and a pair of longitudinal members 24 secured to each side edge 20, 21. The edges 20, 21, 22, 23 each include a respective upstanding wall portion 20a, 21a, 22a, 23a extending therealong. The longitudinal members 24 are fabricated from high tensile steel in this embodiment and includes two spaced apart openings 24a, 24b along each side edge 20, 21 for receiving the forks (not shown) of a forklift (not shown) to allow the crate 1 to be transported, for example using a forklift truck (not shown). Each longitudinal member 24 also includes a cross runner 20b, 21b extending between the openings 24a, 24b at each side edge 20, 21 in order to provide rigidity to the base 2.

*The two end walls 5, 6 are opposite each other as shown in FIG. 1.* Each end wall 5, 6 includes respective upper members 57, 67 as well as respective first and second side members 51 and 52, *vertical members extending from the upper member to the lower member between the side members, a horizontal member extending from one side member to the other between the upper and lower members,* and respective lower members 50 (only one of each is shown in the FIG. 1). The members 50, 51, 52, 57 *are* formed of tubular high tensile steel and define the respective edges of their respective end wall 5, 6.

A first side wall 3 includes a movable or removable wall portion 30 and a fixed or fixable wall portion 35. The movable wall portion 30 includes side members 31, 32, a lower member 33 and an upper member 34, the members 31, 32, 33, 34 formed of tubular high tensile steel and defining the respective edges of the movable wall portion 30. The fixable frame portion 35 includes a cross member 36 and a pair of upstanding members 37, 38.

Figure 3:
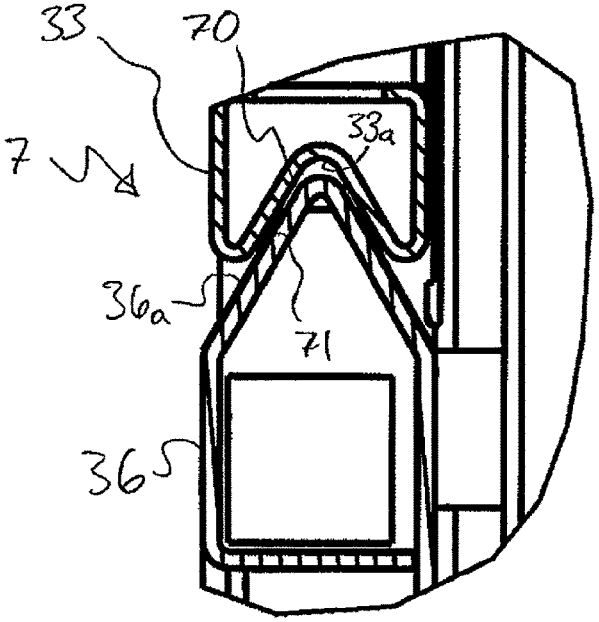
FIG. 3 is a partial section view of a lower locating means along line A-A of FIG. 2.
Figure 4:
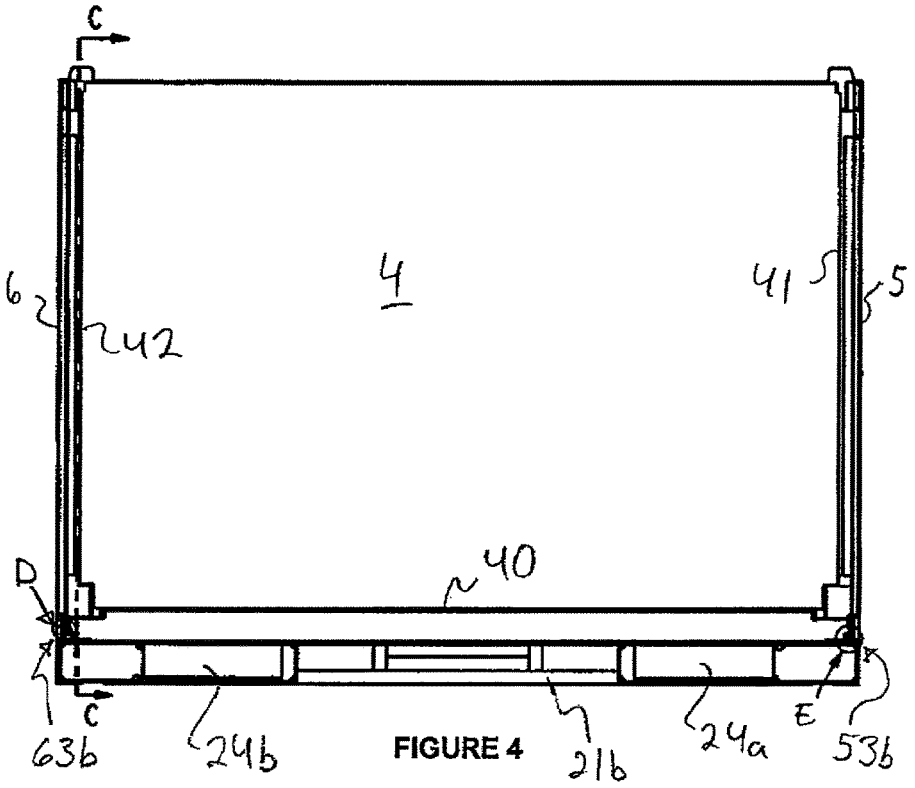
FIG. 4 is a section view of the crate along line B-B of FIG. 2.
Figure 5:
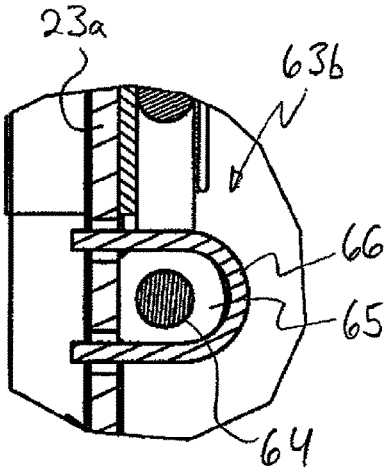
FIG. 5 is a detail view of area D in FIG. 4.
Figure 6:
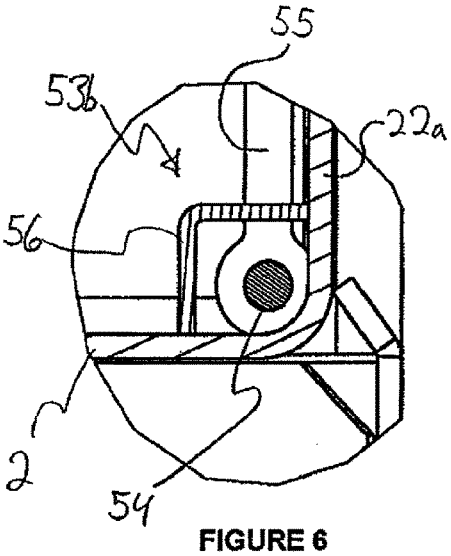
FIG. 6 is a detail view of area E in FIG. 4.

The lower locating means 7, shown more clearly in FIG. 3, is provided by respective cooperating parts 70, 71 of the lower member 33 of the movable wall portion 30 and the cross member 36 of the fixable frame portion 35. In this embodiment, the cooperating part 70 of the lower member 33 is a recess 33a formed in and along a lower portion thereof and the cooperating part 71 of the cross member 36 is an upwardly extending projection 36a on an upper portion thereof. *The projection 36a comprises upwardly converging inner and outer wall portions that meet at a rounded apex. The recess 33a is defined by upwardly converging inner and outer wall portions that meet above the apex of the projection, with the converging inner and outer wall portions being at least partially disposed inwardly and outwardly, respectively, of the projection 36a.*

Referring now to FIGS. 2 to 6, each end wall 5, 6 is hinged to the base 2 by three respective hinges 53a, 53b, 53c and 63a, 63b, 63c. Each hinge 53a, 53b, 53c, 63a, 63b, 63c includes a hinge pin 54, 64 connected thereto by a pair of opposed legs 55, 65, only one of which is shown. The pin 54, 64 extends through a hinge loop 56, 66 secured to the adjacent base wall 22a, 23a between the legs 55, 65. The hinges 53a, 53b, 53c of one end wall 5 are located adjacent the lower end of the base wall 22a to which they are connected, while the hinges 63a, 63b, 63c of the other end wall 6 are located on base wall 23a at a vertical height which is slightly higher to permit collapsing of the crate.

Figure 7:
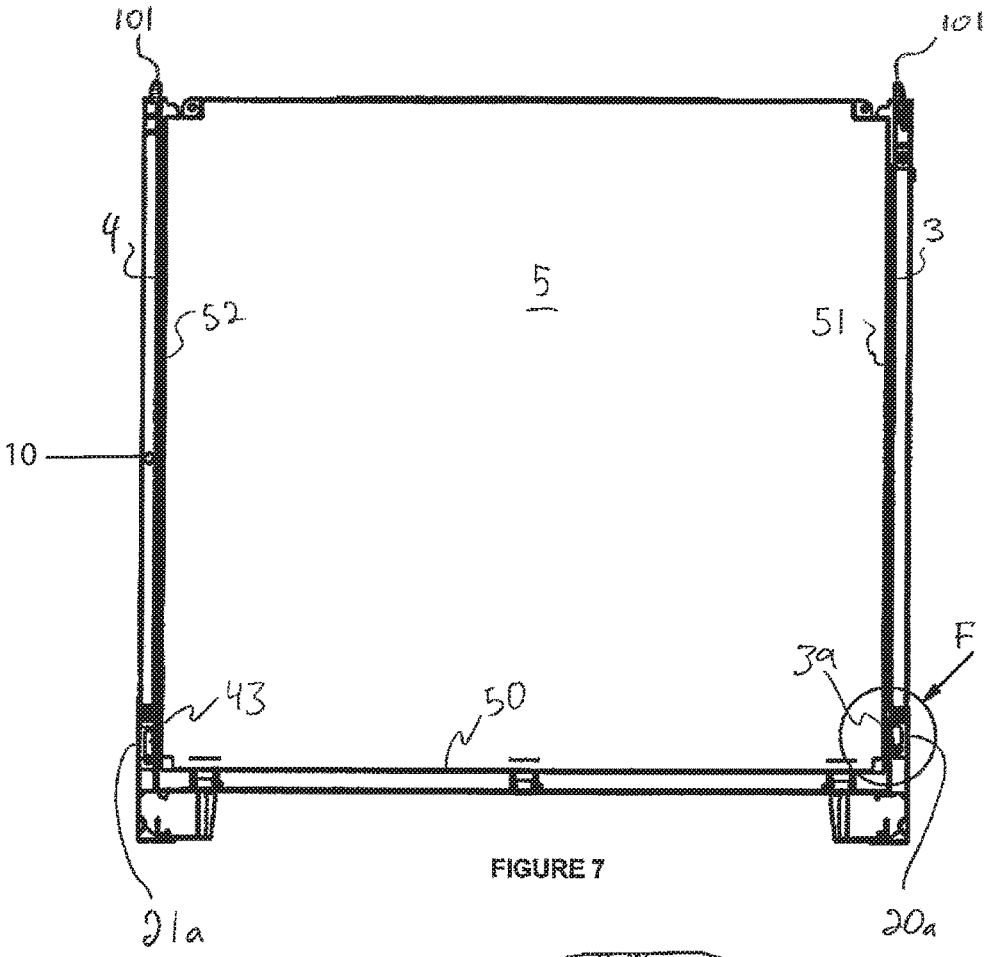
FIG. 7 is a section view of the crate along line C-C of FIG. 4.

The second side wall 4, *which is opposite the first side wall 3 as shown in FIG. 1,* includes a lower member (not shown), a pair of side members (not shown) and an upper member (not shown) which are formed of tubular high tensile steel and define the respective edges of the second side wall 4. The second side wall 4 is hinged to the base 2 by a hinge 43 connected to the adjacent base wall 21a as shown in FIG. 7. The second side wall 4 also includes a securing flange 47a extending from each of the first and second side members *40*, only one of which is shown in the Figures, along its length on an inward facing side thereof. Each of the securing flanges (not shown) includes two securing holes (not shown) through its thickness.

Similarly, the cross member 36 of the fixable portion 35 of the first side wall 3 is hinged to the base 2 by a hinge 39, similar to the hinge 43, connected to the adjacent base wall 20a. Accordingly, only the hinge 39 of the first side wall 3 will be described herein.

Figure 8:
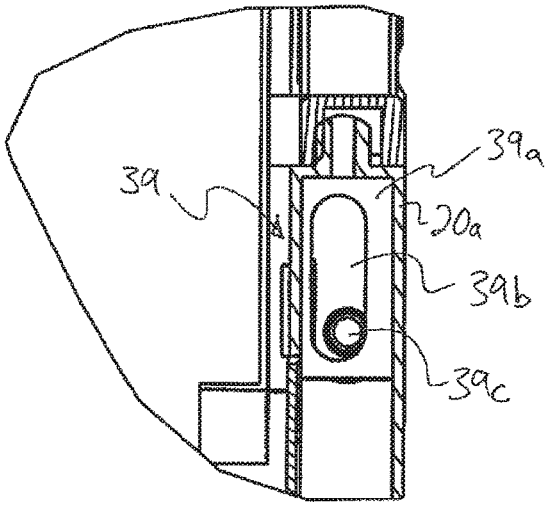
FIG. 8 is a detail view of area F in FIG. 7.

Referring to FIG. 8, the hinge 39 includes a box section 39a at each end of the base wall 20a, which box section has a vertically extending slot 39b therein that receives a hinge rod 39c. The hinge rod 39c is connected to the fixable frame portion 35 and is free to rotate and translate vertically within the hinge slot 39b.

Figure 9:
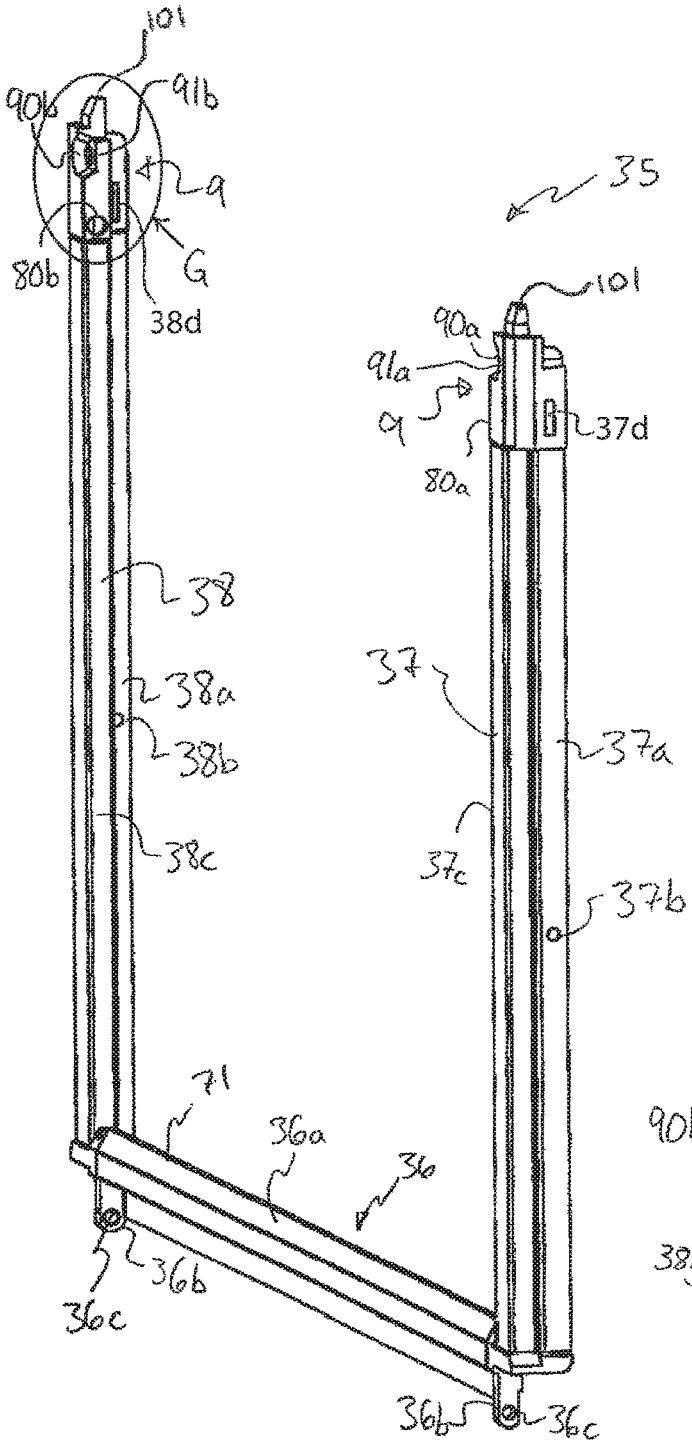
FIG. 9 is a perspective view of a fixable wall portion of a first side wall of the crate of FIG. 1.
Figure 10:
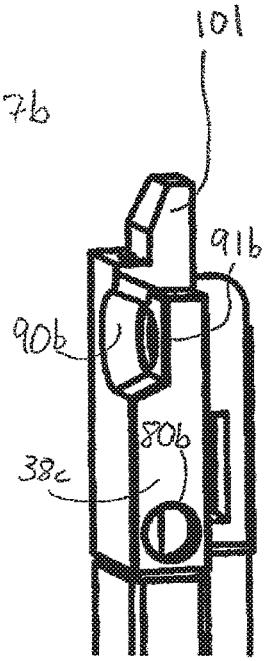
FIG. 10 is a detail view of area G of FIG. 9 illustrating a portion of the upper locating means.

Referring now to FIGS. 9 and 10, the cross member 36 of the fixable portion 35 includes a pair of hinge legs 36b, one of which extends downwardly from each end thereof and includes a hole 36c through its thickness. The hinge rod 39c extends through each of these holes 36c and into the slot 39b of the box sections 39a, thus providing a pivotable and vertically movable connection between the fixable frame portion 35 and the base 2 of the crate 1. Each of the upstanding members 37, 38 includes an end wall securing flange 37a, 38a, a locking hole 80a, 80b and a tapered recess 90a, 90b with an aperture 91a, 91b at the base of the tapered recess 90a, 90b. Each end wall securing flange 37a, 38a extends along the length of its respective upstanding member 37, 38 on a first side thereof and includes two securing holes 37b, 38b through its thickness. Each recess 90a, 90b is adjacent the free end of its respective upstanding member 37, 38 and on the opposite side thereof to the end wall securing flanges 37a, 38a. The locking holes 80a, 80b are located in opposed inner surfaces 37c, 38c of the upstanding members 37, 38 adjacent and vertically lower than the respective tapered recess 90a, 90b (in the orientation shown in FIG. 9).

Adjacent each recess 90a, 90b there is also provided an extension portion 101. While extension portions 101 are shown only at the distal ends of upstanding members 37, 38, they may also be present at the distal ends of other wall edges, for example upstanding members 41, 42 of side wall 4.

Figure 11:
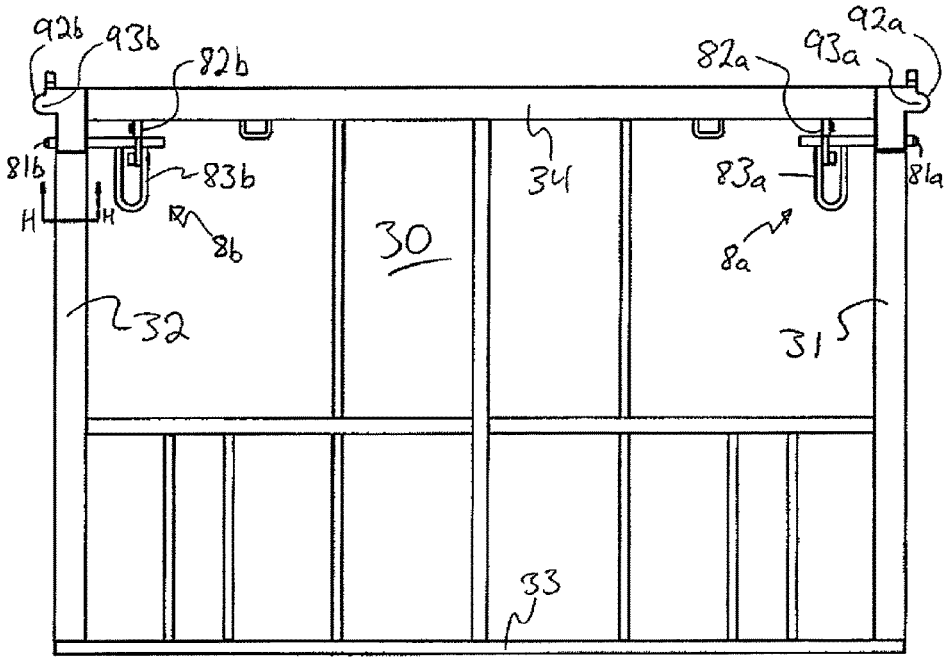
FIG. 11 is a plan view of a movable wall portion of a first side wall of the crate of FIG. 1.
Figure 12:
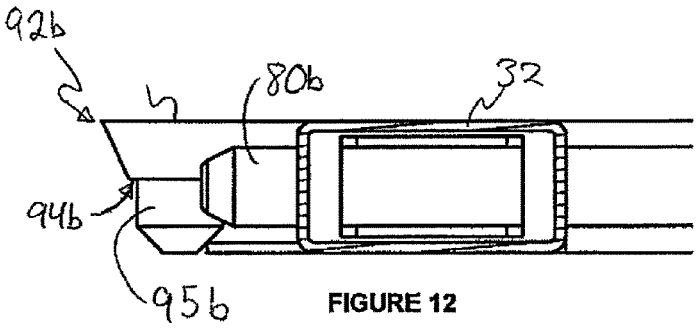
FIG. 12 is a partial section view along line H-H of FIG. 11.

Turning to FIGS. 11 and 12, the movable wall portion 30 includes a locating flange 92a, 92b at each of its top corners and a locking mechanism 8a, 8b under each locating flange 92a, 92b. Each of the locating flanges 92a, 92b includes an outwardly facing flat surface 93a, 93b and tapers inwardly to a flattened apex 94b on which is provided a spigot 95b, only one of which is shown in FIG. 12. Each locking mechanism 8a, 8b includes a pin 81a, 81b connected to a support arm 82a, 82b and includes a handle member 83a, 83b. The loaded locking pins 81a and 81b are biased towards an extended position.

When the crate is assembled and erected, as shown in FIG. 1, the end walls 5, 6 are secured to the side walls 3, 4 by pins [10, 11] which extend through the securing holes 37b, 38b in the securing flanges 37a, 38a and through holes (not shown) in the end walls 5, 6. Rectangular locks (not shown) protruding from the side wall 5 extend through the rectangular securing holes 37d, 38d in the securing flanges 37a, 38a.

The locking means 8 in this embodiment is provided by the loaded locking pins 81a, 81b of the movable wall portion 30 which are received within a respective locking hole 80a, 80b of the fixable wall portion 35. The further locating means 9 in this embodiment is provided by the spigots 95b of the movable wall portion 30 which are received, in use, within a respective aperture 91a, 91b of the fixable frame portion 35. The tapered recesses 90a, 90b provide lead-ins for the spigots 95b and cooperate with the tapered locating flanges 92a, 92b to ensure that the movable wall portion 30 is in its located position with respect to the fixable wall portion 35.

Figure 13:
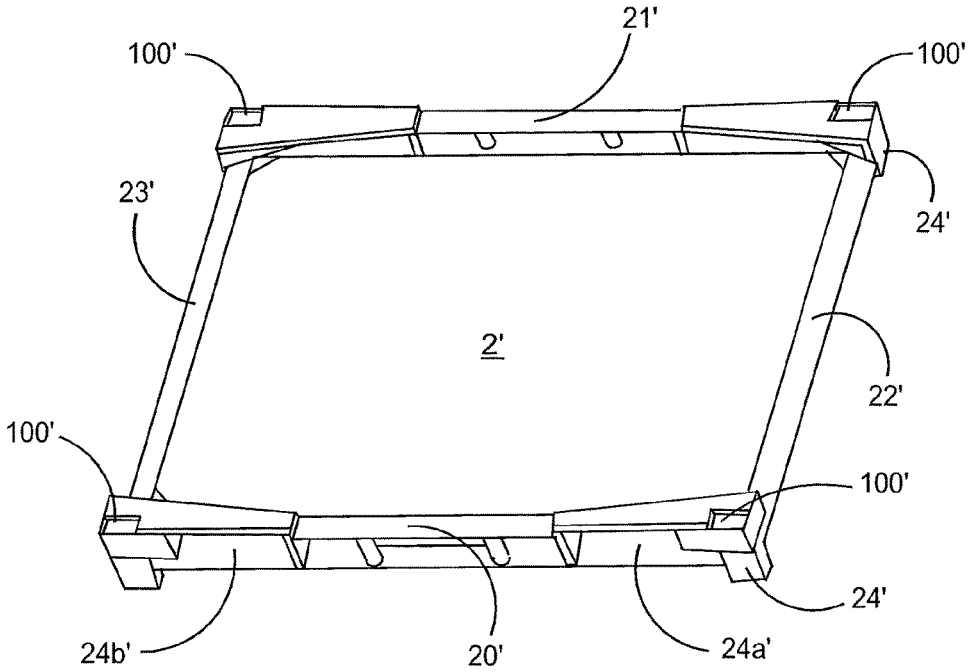
FIG. 13 shows a perspective view of the base of a crate according to the present invention.

Referring now to FIG. 13, there is shown, in isolation, a base 2' of a crate of one embodiment of the present invention. The side and end walls are omitted from FIG. 13 for the purposes of clarity.

The base 2' includes two side edges, 20', 21', two end edges 22', 23' and a pair of longitudinal members 24' secured to each side edge 20', 21'. The longitudinal members 24' comprise two spaced apart openings 24a', 24b' along each side edge 20',21' for receiving the forks (not shown) of a forklift (not shown) to allow the crate to which the base 2' is attached to be transported.

In each of the four corners of the base 2' there is provided an aperture 100'. The aperture 100' extends through the base 2' and provides a recess for receiving an extension portion 101 of an immediate below crate, for example when the crates are stacked when in their erected condition. Extension portions 101 are discussed earlier in the specification and are shown clearly in FIGS. 7, 9 and 10. In use, the extension portions 101 are sized such that they extend into the apertures 100'. They may extend just into or substantially into the aperture 100' or such that they are flush with or extend past the opening of the aperture 100'.

Of course, in alternative embodiments of the invention, the apertures 100' and extension portions 101 may be interchanged without departing from the scope of the invention.

Figure 14:
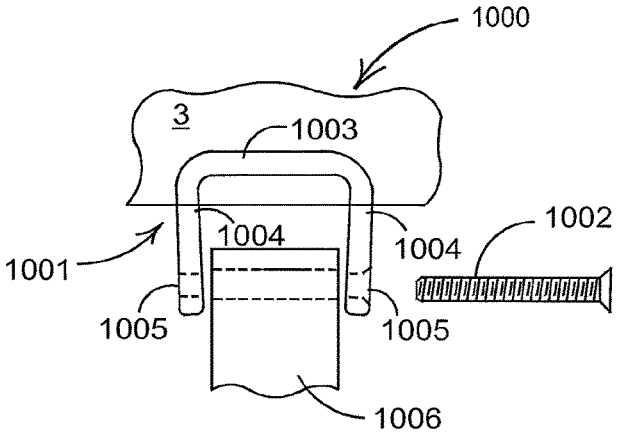
FIG. 14 shows the unassembled parts of a hinge of one embodiment according to the present invention.

Referring now to FIG. 14, there are shown components of a hinge assembly 1000 of one embodiment of the crate of the present invention. The hinge assembly 1000 may represent any one of the hinges 39, 43, 53a, 53b, 53c, 63a, 63b, 63c as previously discussed.

The hinge assembly 1000 comprises two parts: a body portion 1001 and a hinge pin 1002. The body portion 1001 comprises a substantially horizontal portion 1003 having, at each end, opposed legs 1004 extending orthogonally therefrom.

Approximate the distal end of each opposed leg 1004 there is comprised an aperture 1005 extending therethrough. The apertures 1005 are arranged such that they face one another along a common plane. The walls of the apertures 1005 are provided with screw thread (as depicted by the vertical lines shown in FIG. 14).

The body portion 1001 is mounted to a wall 2,3,4,5 of the crate 1, for example, the side wall 3 as shown in FIG. 14.

The hinge pin 1002 is also threaded.

In use, the pin 1002 is wound through the aperture 1005 of a first opposed leg before passing through a hinge loop 1006 secured to an adjacent wall of the base of the crate before being wound through an aperture 1005 of a second opposed leg in order to secure the wall to the base of the crate.

Of course, in alternative embodiments of the invention, the body portion 1001 may be attached to the base of the crate and the hinge loop (not shown) may be attached to the wall portion.

Figure 15:
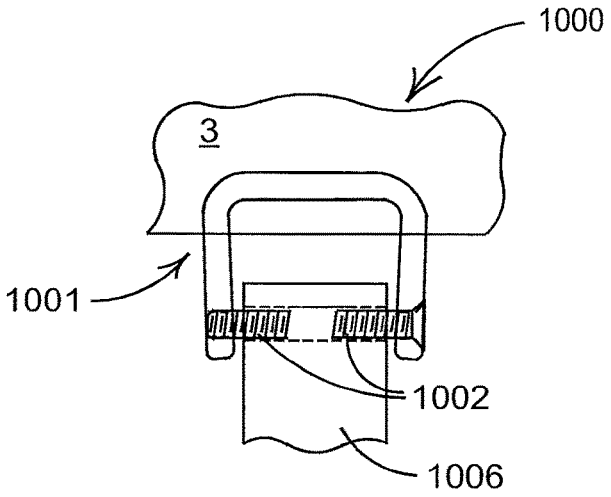
FIG. 15 shows the hinge of FIG. 14, in use.

If the crate was to become damaged, for example the wall was to become unhinged during transportation, then the hinge pin 1002 would remain threaded within the aperture 1005 of the body portion 1001 as shown in FIG. 15. Advantageously, this would prevent the hinge parts from contaminating the carried goods (not shown).

Figure 16:
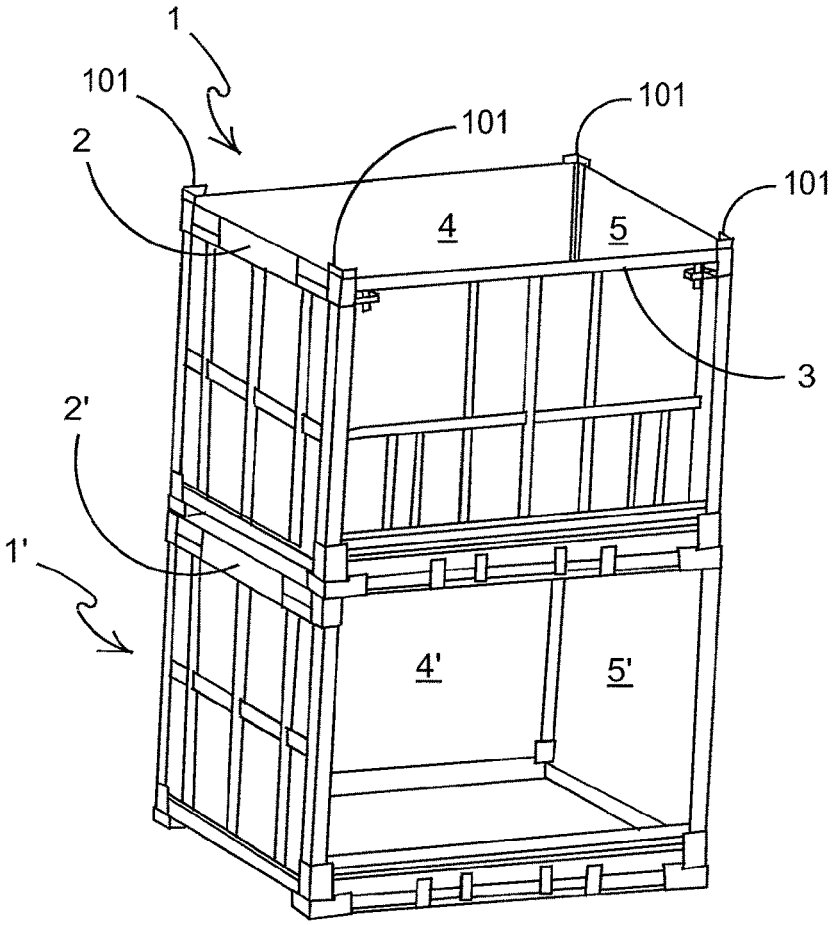
FIG. 16 shows a perspective view of crates according to the present invention stacked on top of one another.

Referring now to FIG. 16, there are shown two crates according to the present invention stacked upon one another. Safe stacking is effected because the extension portions 101 of the lower crate 1' are in engagement with the apertures 100' of the upper crate 1.

As previously disclosed, the crates are formed from high tensile steel. Due to their rigidity and high strength properties it is possible to stack the crates up to five high and transport them whilst stacked, e.g. using a forklift truck, without them collapsing. Moreover, it is possible to remove the wall portion of any one or more crates while stacked for easy access to their contents (as shown in FIG. 16) without sacrificing properties of rigidity and strength.

In use, the contents of the assembled and erected crate 1 shown in FIG. 1 may be accessed by retracting the loaded locking pins 81a, 81b using the handle members 83a, 83b, which are pulled away from the upstanding members 37, 38 of the fixable portion 35, thus releasing the locking means 8. The handle members 83a, 83b may then be used to pivot the movable wall portion 30 about its lower member 33, thus removing the spigots 95b from the apertures 91a, 91b and releasing the upper locating means 9. The movable wall portion 30 may then be removed, for example by using the handle members 83a, 83b and/or the side members 31, 32 and placed in a convenient location adjacent the crate 1.

In order to replace the movable wall portion 30, it is lifted as discussed above and is placed such that the recess 33a in the lower member 33 rests on or receives the protrusion 36a on the cross member 36 of the fixable frame portion 35. The handle members 83a, 83b are again urged away from the upstanding members 37, 38 of the fixable portion 35 to retract the locking pins 81a, 81b. The upper end of the movable wall portion 30 is then pivoted toward the fixable frame portion 35 until the spigots 95b are received within the apertures 91a, 91b and the locking pins 81a, 81b are urged to engage the locking holes 80a, 80b.

As the movable wall portion 30 pivots, the lower locating means 7 positively causes or encourages further pivoting and acts as an abutment to keep the movable wall portion 30 in place when the crated is loaded.

Thus, the lower locating means 7 and the upper locating means 9 independently and/or in combination provide a convenient and accurate means for locating and/or securing the removable wall portion 30 relative a fixed portion 35 thereof to allow the resiliently urged locking means to engage the apertures.

It will be appreciated that the lower locating means 7 cooperates with the loaded locking means 8 to locate and secure the removable wall portion 30 along its lower edge 33, thus preventing, for example, rotation about the locking pins 81a, 81b. This feature is partly due to the vertical overlap of the protrusion 36a and recess 33a and partly due to the horizontal extent of the overlap or cooperation.

Moreover, the upper locating means 9 provides accurate location of the locking pins 81a, 81b relative to the locking holes 80a, 80b. This facilitates quick and easy movement and/or removal and/or replacement of the movable or removable portion 30 relative to the fixed portion 35.

In order to collapse the crate 1, the movable portion 30 is secured in place using the lower locating means 7, the locking means 8 and the upper locating means 9 as described above. The pins 10, 11 of a first of the end walls 5 are removed and the first end wall 5 is pivoted inwardly of the crate 1 about its hinges 53a, 53b, 53c until it rests on the base 2. The pins 10, 11 of the second end wall 6 are then removed and the second end wall is pivoted inwardly about its hinges 63a, 63b, 63c until it rests on the first end wall 5. The second side wall 4 is lifted (by virtue of its vertically extending hinge slot (not shown)) as required and pivoted inwardly about its hinge 43 until it rests on the second end wall 6. The first side wall 3 is then lifted vertically as required (by virtue of its vertically extending hinge slot 39b) and pivoted inwardly about its hinge 39 until it rests on the second side wall 4.

In this collapsed position, a plurality of crates 1 may be stacked one on top of the other for transportation, for example as described in WO 03/055755.

It will be appreciated that the provision of a movable and/or removable wall portion 30 which extends across the majority of the side wall 3 provides simple, easy and unhindered access to the contents of the crate 1.

It will also be appreciated that several variations of the embodiment described herein are envisaged without departing from the scope of the invention. For example, the first locating means 36 need not be provided at and/or along the lower edge 33 of the movable wall portion 30 and/or may be replaced by a permanently connected hinge for example. The lower edge 33 may be provided with a projection, which may extend along its length or only be present at one or more regions thereof. Additionally or alternatively the first locating means 36 may be provided in part by a projection or recess in a portion of the movable wall portion 30 adjacent but spaced from the lower edge 33.

Moreover, the other side wall 4 may advantageously have a movable or removable portion (not shown) similar to that of the first side wall 3. This would provide more flexibility, albeit with a greater degree of complexity.

The pins 10, 11 which extend through the securing holes 37b, 38b in the securing flanges 37a, 38a and through holes in the end walls 5, 6 to secure the end walls 5, 6 to the fixable portion 35, may comprise any securing means such as nut and bolt arrangements.

The fixed or fixable portion 35 may be omitted in part or in its entirety and, for example, some or all of the features thereof may be incorporated in one or more end walls 5, 6 and/or in the base 2.

The removable wall portion 30 may comprise a hinge, for example separating it into upper and lower parts similar to the crate described in WO 03/055755.

Whilst the crate disclosed herein is formed of high tensile steel, it may comprise any suitable material such as aluminium, rigid plastics material or the like.

The three hinges 53a, 53b, 53c and 63a, 63b, 63c which respectively connect the end walls 5, 6 to the base 2 may be replaced by a single hinge (not shown) or any number of hinges (not shown).

Any feature disclosed herein and/or its function may be provided and/or claimed in isolation and/or in combination.

Without further elaboration the foregoing will so fully illustrate our invention that others may, by applying current or future knowledge, adopt the same for use under various conditions of service.

The invention claimed is:

[1. A collapsible crate having an erected and a collapsed condition for transporting goods in the erected condition, the crate having a base and upstanding walls, i) at least one of the upstanding walls comprising a frame and a removable wall portion, the frame including a cross member and the frame being hingedly attached to the base portion, the removable wall portion having a lower member;

ii) locating means; and iii) releasable locking means for releasably securing in the erected condition the movable wall portion relative to the frame, iv) the locating means being provided by an upwardly extruding projection of the lower member of the removable wall portion co-operating with a recess in the cross member of the frame to align, in use, the removable wall portion relative to the frame such that the removable wall portion is releasably securable in the erected condition by the releasable locking means and on release of the releasably locking means to permit the removeable wall portion to be pivoted outwardly relative to the frame about the locating means.]

[2. The crate according to claim 1, further comprising further releasable locking means at or adjacent an upper portion of the removable wall portion.]

[3. The crate according to claim 1, wherein the locating means is operably cooperable, in use, with the releasable locking means to secure the lower portion of the removable wall portion against movement thereof.]

[4. The crate according to claim 1, wherein the projection is provided on one of the removable wall portion and the frame.]

[5. The crate according to claim 4, wherein the recess or aperture is provided in the other of the removable wall portion and the frame.]

[6. The crate according to claim 1, further comprising a further locating means located at or adjacent an upper end or edge of the removable wall portion.]

[7. The crate according to claim 6, wherein said further locating means comprises a projection, which is provided on one of the removable wall portion and an adjacent portion of the frame.]

[8. The crate according to claim 7, wherein the projection of said further locating means is receivable within a recess or aperture, in the other of the removable wall portion and the adjacent portion of the frame.]

[9. The crate according to claim 6, wherein the further locating means is operably cooperable, in use, with the releasable locking means to secure the removable wall portion against movement thereof.]

[10. The crate according to claim 7 wherein the further locating means is operably cooperable, in use, with the releasable locking means to secure the removable wall portion against movement thereof.]

[11. The crate according to claim 7 wherein the projection of said further locating means is receivable within a recess or aperture in the other of the removeable wall portion and the adjacent portion of the frame and wherein the further locating means is operably cooperable, in use, with the releasable locking means to secure the removable wall portion against movement thereof.]

[12. The crate according to claim 1 wherein the at least one of the upstanding walls comprising the frame and the removeable wall portion is connected to the base by a pivotable and vertically moveable connection.]

*13. A collapsible crate having an erected and a collapsed condition for transporting goods in the erected condition, the crate having a base and upstanding walls,*

*i) at least one of the upstanding walls comprising a frame and a removable wall portion, the frame including a cross member and the frame being hingedly attached to the base, the removable wall portion having a lower member;*

*ii) locating means; and*

*iii) a releasable locking mechanism for releasably securing in the erected condition the removable wall portion relative to the frame,*

*iv) the locating means being provided by an upwardly extending projection of the cross member of the frame co-operating with a recess in the lower member of the removable wall portion to align, in use, the removable wall portion relative to the frame such that the removable wall portion is releasably securable in the erected condition by the releasable locking mechanism and on release of the releasable locking mechanism to permit the removable wall portion to be pivoted outwardly relative to the frame about the locating means,*

*wherein the projection is within the recess,*

*the recess being partially defined by an outer portion of the lower member disposed outward of the projection, and the recess being partially defined by an inner portion of the lower member disposed inward of the projection,*

*wherein the removable wall portion has freedom to pivot while the projection is within the recess,*

*wherein the projection comprises upwardly converging inner and outer wall portions that meet at a rounded apex, and*

*wherein the inner and outer portions that define the recess converge upwardly and meet above the apex of the projection.*

*14. The collapsible crate of claim 13 wherein the removable wall portion extends to the top of the collapsible crate when the collapsible crate is in an erected condition.*

*15. The collapsible crate of claim 13 wherein the lower member of the removable wall portion is formed of tubular steel.*

*16. The collapsible crate of claim 13 wherein the releasable locking mechanism is at or adjacent an upper portion of the removable wall portion.*

*17. The collapsible crate of claim 13 wherein the locating means is operably cooperable, in use, with the releasable locking mechanism to secure the lower portion of the removable wall portion against movement thereof.*

*18. The collapsible crate of claim 13 further comprising a further locating means located at or adjacent an upper end or edge of the removable wall portion wherein the further locating means is operably cooperable, in use, with the releasable locking mechanism to secure the removable wall portion against movement thereof.*

*19. The crate according to claim 18, wherein said further locating means comprises a projection, which is provided on one of the removable wall portion and an adjacent portion of the frame.*

*20. The crate according to claim 19, wherein the projection of said further locating means is receivable within a recess or aperture, in the other of the removable wall portion and the adjacent portion of the frame.*

*21. The crate according to claim 13 wherein the frame is hingedly attached to the base by a pivotable and vertically moveable connection.*

* * * * *